Dec. 18, 1962　　　L. T. KNOCKE　　　3,068,848
VALVE ROTATING MECHANISM
Filed Dec. 29, 1960　　　　　　　　　　　　　　3 Sheets-Sheet 1
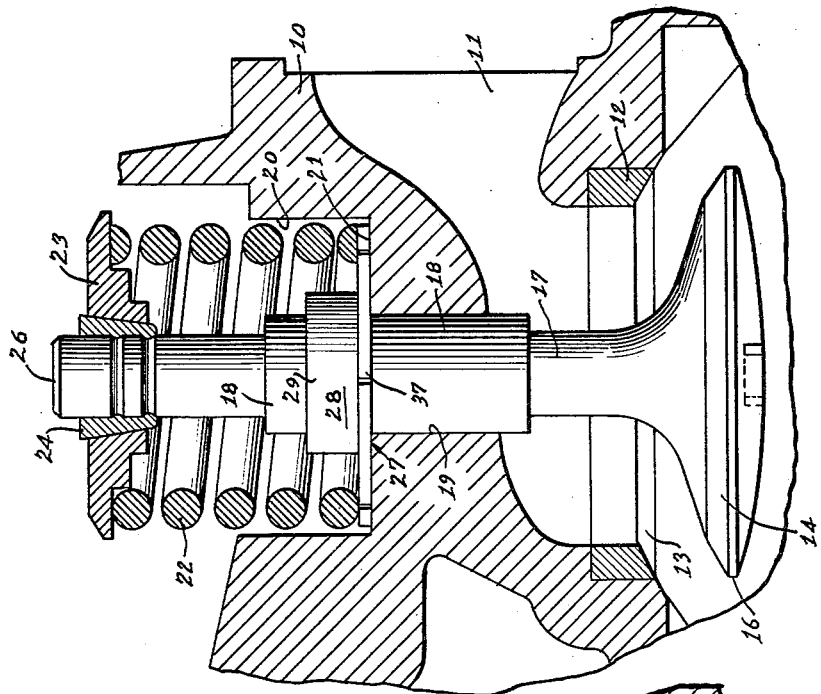
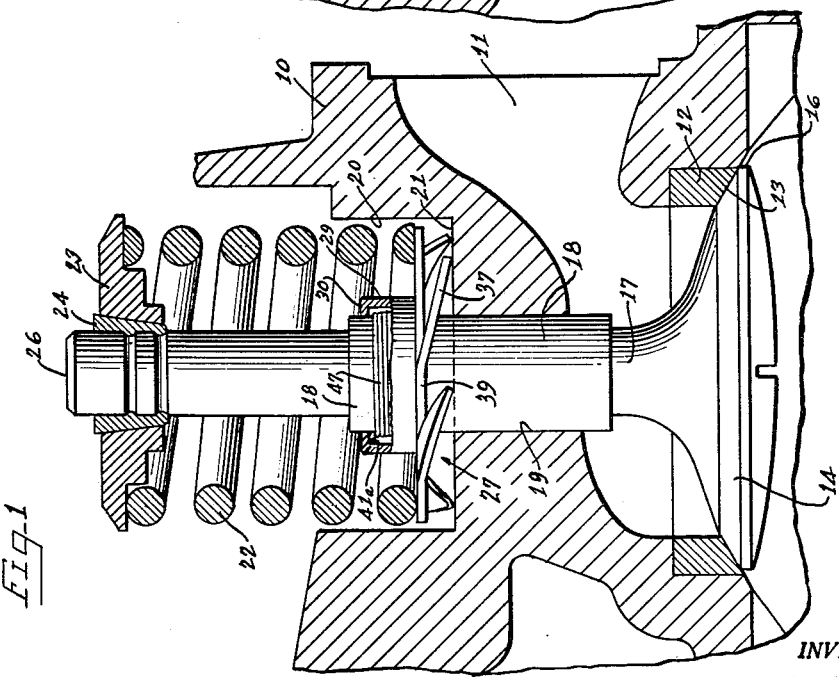
INVENTOR.
Louis T. Knocke
BY
ATTORNEYS Dec. 18, 1962 L. T. KNOCKE 3,068,848
VALVE ROTATING MECHANISM
Filed Dec. 29, 1960 3 Sheets-Sheet 2

INVENTOR.
Louis T. Knocke
BY
ATTORNEYS

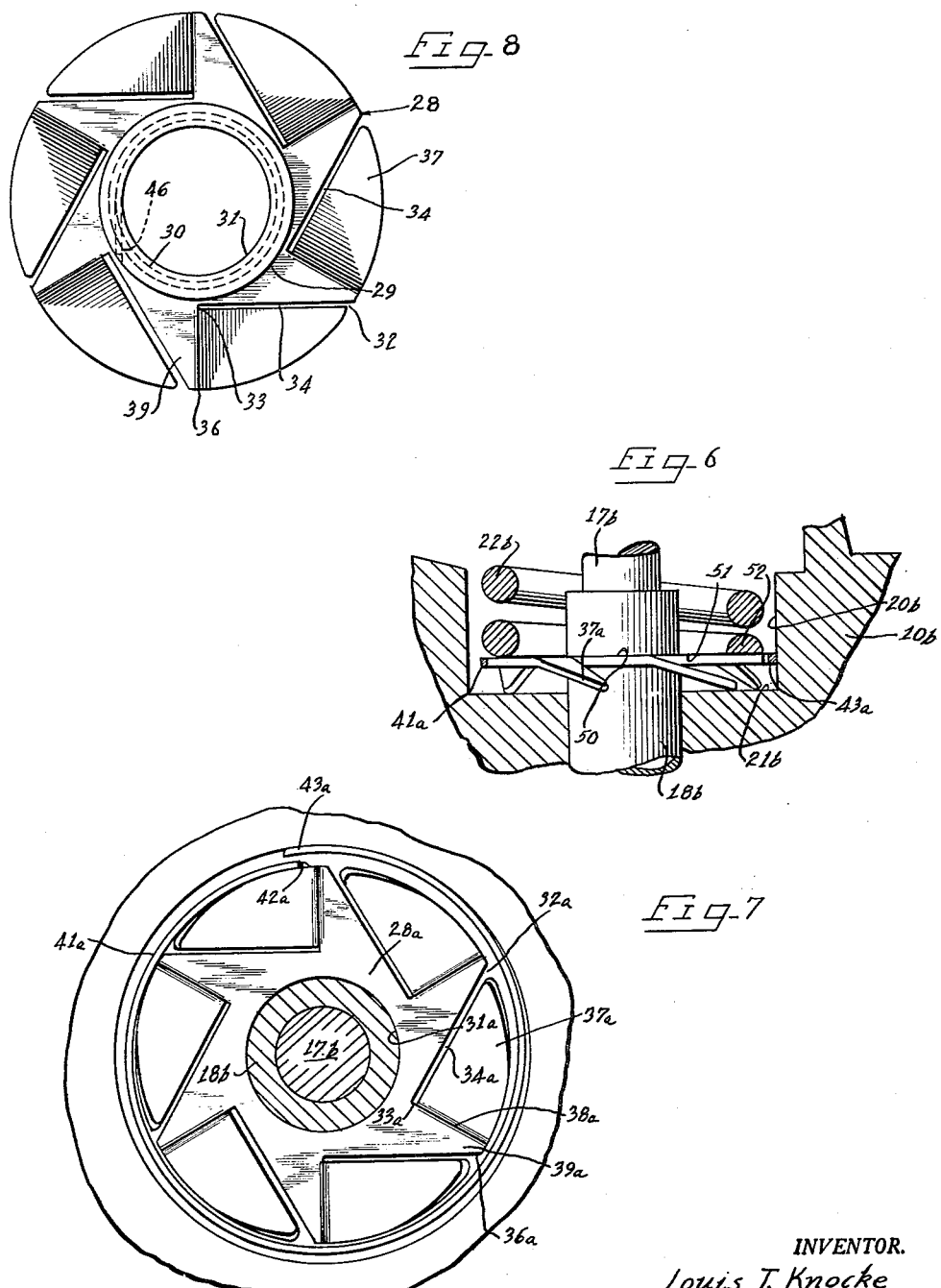

United States Patent Office 3,068,848
Patented Dec. 18, 1962

3,068,848
VALVE ROTATING MECHANISM
Louis T. Knocke, Birmingham, Mich., assignor to Thompson Ramo Wooldridge Inc., Cleveland, Ohio, a corporation of Ohio
Filed Dec. 29, 1960, Ser. No. 79,358
15 Claims. (Cl. 123—90)

This invention relates generally to a mechanism for incrementally rotating axially adjacent parts and more specifically relates to a rotating mechanism for a valve apparatus.

In the mechanical arts, it is frequently desirable to incrementally rotate two relatively rotatable axially adjacent parts. For example, in a valve mechanism, the problems involved in connection with pitting and galling may be obviated by providing a valve rotating device which insures that the valve head will be incrementally rotated, thereby to effect a successive shifting between the valve seat and the adjoining surfaces of the valve head during the cyclic operation of the valve.

In accordance with the principles of the present invention, normal axial loads are transmitted between two relatively rotatable parts, for example, a valve part and an engine part, by transmitting the load through a multiple cantilever arm spring washer. The multiple cantilever arms of the spring washer are compressed to a relatively flat shape in response to an increased axial load between the parts, thereby to effect incremental rotation of the washer.

In order to prevent rotary motion in an opposite direction upon return to axial load, the device is provided with a clutch spring.

A device capable of effecting such operation is conveniently interposed between an engine part and the valve spring and operates to effectively drive the valve in incremental rotation during the normal cyclic operation of the valve.

It is an object of the present invention to provide an improved valve rotating mechanism which can be economically manufactured and which is efficient in operation.

Another object of the present invention is to provide a valve rotating device which is made from a reduced number of simplified elements.

Many other advantages, features and additional objects of the present invention will become manifest to those versed in the art upon making reference to the detailed description which follows and the accompanying sheets of drawings in which a preferred structural embodiment of a valve rotating device incorporating the principles of the present invention is shown by way of illustrative example.

On the drawings:

FIGURE 1 is a cross-sectional view of an engine part showing a valve equipped with a valve-rotating mechanism in accordance with the principles of the present invention, and showing the valve in a closed position with the elements of the valve rotating device in a corresponding operating position;

FIGURE 2 is a view similar to FIGURE 1 but showing the components repositioned corresponding to a valve open position;

FIGURE 6 is an alternative arrangement of a valve rotating mechanism embodying the principles of the present invention;

FIGURE 7 is a top plan view of the device of FIGURE 6 but with the valve spring removed; and FIGURE 8 is an elevational view of a multiple cantilever arm washer of FIGURE 1, as provided in accordance with the principles of the present invention.

As shown on the drawings:

Figure 3:
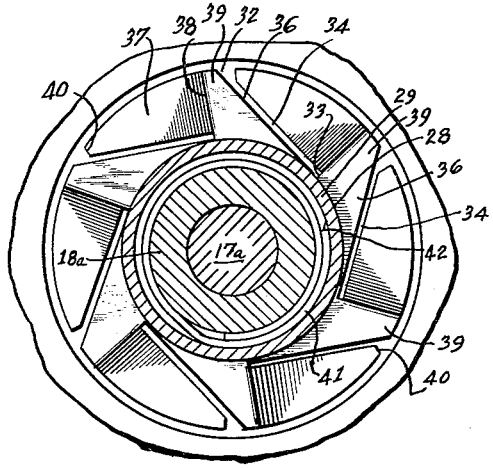
FIGURE 3 is a cross-sectional view showing a valve rotating mechanism embodying the principles of the present invention but utilizing a different form of clutch spring than the device of FIGURES 1 and 2.

In FIGURES 1 and 2 there is shown an engine part 10 having a port 11 formed with a valve opening and in which is placed a valve insert 12 forming a beveled valve seating surface 13 for engaging and seating the adjoining beveled surface 14 provided on a valve head 16 which controls the flow through the port 11.

The valve head 16 has integrally connected thereto a valve stem 17. The stem 17 is reciprocably and slidably supported in a valve stem guide 18 carried in firm assembly in the engine part 10 and received in a valve stem guide opening 19. The valve stem guide opening 19 is counterbored as at 20, thereby to provide a radial wall 21 at the bottom of the counterbore 20 which normally functions to bottom one end of a valve spring 22. The other end of the valve spring 22 engages against a valve spring retainer 23 locked to the end of the valve stem 18 by means of the usual segmented valve stem lock 24. The end of the valve stem as at 26 is adapted to be engaged by an actuator mechanism so that the valve may be moved from the closed position of FIGURE 1 against the normal closing bias of the valve spring 22, thereby to increase the axial valve loading and to open the valve head 16 away from the valve seat insert 12 and thereby permit flow through the port 11.

In accordance with the principles of the present invention, a valve rotating mechanism is provided which may be conveniently interposed between the valve spring 22 and the wall 21 on the engine part 10. Thus, the valve rotating mechanism of the present invention is indicated generally at 27 and may be referred to herein as a device for rotatably driving two axially adjacent parts such as an inner part and an outer part constituted respectively by the valve formed by the valve stem 17 and the valve head 14 and the outer part formed by the engine part 10.

The valve rotating mechanism 27 provided in accordance with the principles of the present invention constitutes two simple parts, namely, a multiple cantilever arm spring washer and a one directional clutch spring.

Figure 4:
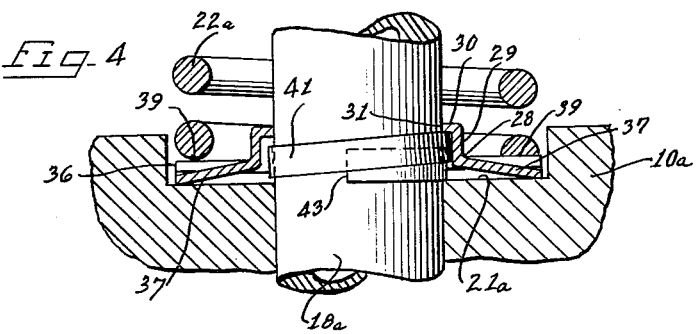
FIGURES 4 and 5 are similar cross-sectional views but showing the valve rotating device of FIGURE 3 in a valve open position (FIGURE 4) and in a valve closed position (FIGURE 5)
Figure 5:
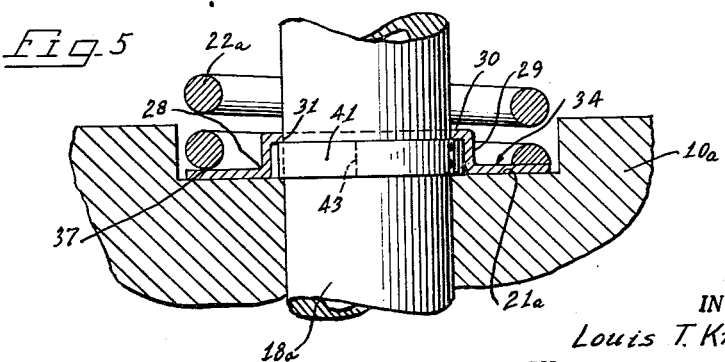

Referring specifically to FIGURES 3, 4 and 5, it will be noted that there is provided a washer shown generally at 28 having an axially flanged portion 29 radially offset as at 30 and having formed therein a center opening 31.

The washer 28 has a plurality of slots or slits or slotted grooves formed therein each respective slot or groove starting at the outer periphery as at 32 and extending generally tangentially inwardly of the center opening 31 or the axial flanged portion 29 to terminate as at 33, thereby to form a slot or groove identified at 34. In the illustrative embodiments shown, there are six grooves 34 so that a cantilever arm 36 is provided between each respective pair of grooves 34, 34 which extend tangentially outwardly from the axially flanged portion 29, all of the arms 36 being circumferentially spaced with respect to one another.

The portion of each respective arm which is essentially coextensive in length with each corresponding groove 34, constitutes a finger portion 37. Thus, each finger portion 37 is axially offset beginning from a radially extending line 38 between the finger portion 37 and an adjoining portion of the arm 36 referred to for purposes of clearer identification by the numeral 39. The free end of each respective finger portion 37 has a tip which must be blunt and broad enough to friction grip an adjoining wall surface. Thus, each finger 37 is provided with a tip 40 forming an abutment surface which is made blunt and broad by eliminating any point or knife-edge formed by the slotting operation. In the embodiment of FIGURES 3, 4 and 5, the abutment surfaces 40 of the fingers 37 on each arm 36 engage against a wall surface 21a of an engine part 10a.

When the free ends of the arms 36 are compressed to a flat shape, or, in other words, when the fingers 37 are flattened, they elongate and cause the arm portions 39 in contact with the valve spring to rotate slightly, thus rotatably driving the valve spring and the valve as well. In FIGURE 4 the valve spring 22a is shown in the valve closed position, while in FIGURE 5 the valve spring 22a is compressed to the valve open position and all of the fingers 37 are flattened.

Assuming an incremental clockwise rotation using the orientation of FIGURES 3-5, it is contemplated by the present invention to provide a clutch spring which will prevent counterclockwise motion upon completion of the valve cycle to the valve closed position. Those versed in the art will recognize that many different forms of clutch springs may be successfully employed with the valve-rotating arrangements of the present invention, for example, a round pin type or a shoe type or a so-called form sprag clutch. In the illustrative embodiment herein disclosed the arrangement of FIGURES 3, 4 and 5 illustrates a flat coil spring which is particularly efficient and which comprises a flat coil 41 fastened as at 42 to the axially extending flange 29 of the washer 28 and wound to provide two or more coils of the spring which fit the valve stem retainer 18a snugly. The free end of the band is shown at 43 (FIGURE 4).

In a typical valve application such as that illustrated in FIGURES 3-5 and wherein clockwise rotation is developed due to an increase of the valve spring load from approximately 70 to 170 pounds, the internal locking band provided by the clutch spring 43 makes the rotation function effective and affords unidirectional valve rotation.

While the specific form of rotating device shown generally at 27 in FIGURES 1 and 2 is in most respects identical with that shown in FIGURES 3, 4 and 5, a different form of clutch spring is provided in that the clutch spring of FIGURES 1 and 2 is attached as at 46 (FIGURE 8) to the axially flanged portion 29 and is helically wound as at 47 around the valve stem retainer 18. The opposite end of the helically wound spring is left free. Thus, when the spring fingers 37 are flattened, they elongate and cause the portion of the washer 28 in contact with the spring 22 to rotate slightly and incremental rotation of the valve 14 will occur in clockwise direction. The helically wound spring will then be tightened around the valve stem retainer 18, preventing rotation of the valve 14 in an opposite direction.

The multiple cantilever arm spring washer of the present invention may also be used in a form as is illustrated in FIGURES 6 and 7.

In that form of the invention, there is provided a substantially flat washer 28a having a center opening 31a through which is passed a valve stem retainer 18b carried in an engine part 10b.

A plurality of slots 34a are formed in the washer, each respective slot 34a entering the outer peripheral edge of the washer as at 32a and extending generally tangentially to terminate as at 33a which coincides with a radius 38a, thereby to form between adjacent pairs of slots 34a an arm 36a which is in cantilever relation to the central body portion of the washer and includes a main arm portion 39a and a finger portion 37a.

The finger portions 37 are axially offset away from a surface 50 and engage the wall 21b formed at the bottom of a spring recess 20b in the engine part 10b. Thus, the surface 50 is spaced upwardly and contacts a surface 51 formed on an end convolution 52 of the valve spring 22b. Upon increased valve loading, the valve spring 22b and the valve will rotate.

In order to provide a clutching effect, the arrangement of FIGURES 6 and 7 contemplates the utilization of an external locking band which is shown at 41a, the band 41a being attached to the outer peripheral portion of the washer 28a as at 42a and extending around the washer 28a so that the free end thereof shown at 43a lies adjacent the outer wall of the spring recess 20b.

Although minor modifications might be suggested by those versed in the art, it should be understood that I wish to embody within the scope of the patent warranted hereon all such modifications as reasonably and properly come within the scope of my contribution to the art.

I claim as my invention:

1. A rotating device comprising inner and outer relatively rotatable parts, a multiple cantilever arm spring washer having axially offset fingers engaging one of the parts and a body portion engaging the other of the parts, thereby to transmit axial forces between the parts through said fingers, said fingers flattening in response to increased axial force to incrementally rotate said washer with respect to one of said parts, and a locking spring means engaged between said washer and said one of said parts operating to lock said washer to said one of said parts for preventing rotation in an opposite direction when the axial force is decreased and the fingers resume their normal offset shape.

2. A valve rotating device for rotating a spring-biased valve part in an engine part, comprising a washer having a center aperture through which a valve stem of a valve may extend, said washer having a body portion and multiple cantilever fingers offset in axial direction for engaging respectively the valve spring and the adjoining engine part, and a clutch spring for temporarily locking said washer to said engine part, whereupon increased valve load will flatten the fingers to incrementally rotate the washer and lock the washer against reverse rotation, thereby to rotatably drive the valve relative to the engine part.

3. A rotating device comprising inner and outer relatively rotatable parts, a multiple cantilever arm spring washer having axially offset fingers engaging one of the parts and a body portion engaging the other of the parts, thereby to transmit axial forces between the parts through said fingers, said fingers flattening in response to increased axial force to incrementally rotate said washer with respect to one of said parts, and a clutch spring engaging said washer and said one part in response to said incremental rotation to lock the washer against reverse rotation when the axial force is decreased and the fingers resume their normal offset shape, thereby effecting unidirectional incremental rotation.

4. A valve rotating device comprising a washer having a central apertured body portion and a plurality of circumferentially spaced arms having finger portions offset axially from one side thereof, one side of said washer forming a spring seat and the other side of said washer forming an engagement surface for an engine part, and a clutch spring engaged between said washer and an adjoining part to incrementally rotate the washer whenever the washer is flattened during a valve opening cycle.

5. A valve rotating device comprising a washer having a central apertured body portion and a plurality of circumferentially spaced arms having finger portions offset axially from one side thereof, one side of said washer forming a spring seat for a valve spring and the other side of said washer forming an abutment surface to engage an engine part, and a helically wound spring for encircling a valve stem and having an end fastened to said washer to incrementally rotate the washer whenever the washer is flattened during a valve opening cycle.

6. A valve rotating device comprising a washer having a central apertured body portion and a plurality of circumferentially spaced arms having finger portions offset axially from one side thereof, one side of said washer forming a spring seat for a valve spring and the other side of said washer forming an abutment surface to engage an engine part, and a flat clutch spring having one end connected to said washer and having the other end formed to wrap around an adjoining valve stem for locking the washer to an engine part temporarily, whereby the washer will be incrementally rotated whenever the washer is flattened during a valve-opening cycle.

7. A valve rotating device comprising a washer having a central apertured body portion and a plurality of circumferentially spaced arms having finger portions offset axially from one side thereof, one side of said washer forming a spring seat for a valve spring and the other side of said washer forming an abutment surface to engage an engine part, and a flat clutch spring having one end connected to the outside peripheral edge of said washer and having the other end formed to wrap around said washer and engage an adjoining wall of an engine part whereby the washer will be incrementally rotated whenever the washer is flattened during a valve opening cycle.

8. A valve rotating device comprising a valve stem, and a valve spring surrounding said stem, a washer having an axially flanged center opening passing said valve stem, said washer having a plurality of slots extending from the outer periphery thereof generally tangentially inwardly of the center opening, thereby to form a plurality of circumferentially spaced arms, each of said arms having a finger coextensive in length with a corresponding slot and being offset axially, said arms and said offset fingers forming a pair of axially spaced surfaces for engaging an engine part and for seating a valve spring, and clutch spring means engaging with said washer and an adjoining wall surface, whereby flattening of said washer in response to increased valve loading will wind up said clutch spring to temporarily lock said washer against reverse rotation and effect incremental rotation between the valve and the engine part unidirectionally.

9. A valve rotating device comprising a washer having an axially flanged valve stem guide opening, said washer having a plurality of slots extending from the outer periphery thereof generally tangentially inwardly of the center opening, thereby to form a plurality of circumferentially spaced arms, each of said arms having a finger generally coextensive in length with a corresponding slot and being axially offset to form an abutment surface, and a clutch spring connected to said washer and being adapted to temporarily lock said spring washer against reverse rotation, whereby said washer may be interposed between a valve spring and an engine part for incrementally driving the valve in rotation unidirectionally.

10. A valve rotating device comprising a washer having an axially flanged valve stem guide opening, said washer having a plurality of slots extending from the outer periphery thereof generally tangentially inwardly of the center opening, thereby to form a plurality of circumferentially spaced arms, each of said arms having a finger generally coextensive in length with a corresponding slot and being axially offset to form an abutment surface, and a clutch spring comprising a torsion spring having one end connected to the axially flanged portion of said washer and being wound helically relative to said center opening to operatively engage the adjoining surface of the valve stem guide, whereby said washer may be interposed between a valve spring and an engine part for incrementally driving the valve in rotation.

11. A valve rotating device comprising a washer having an axially flanged valve stem guide opening, said washer having a plurality of slots extending from the outer periphery thereof generally tangentially inwardly of the center opening, thereby to form a plurality of circumferentially spaced arms, each of said arms having a finger generally coextensive in length with a corresponding slot and being axially offset to form an abutment surface, and a clutch spring comprising a flat band spring having one end connected to the axially flanged portion of the washer and being wound around the valve stem guide, whereby said washer may be interposed between a valve spring and an engine part for incrementally driving the valve in rotation.

12. A valve rotating device comprising a washer having an axially flanged valve stem guide opening, said washer having a plurality of slots extending from the outer periphery thereof generally tangentially inwardly of the center opening, thereby to form a plurality of circumferentially spaced arms, each of said arms having a finger generally coextensive in length with a corresponding slot and being axially offset to form an abutment surface, and a clutch spring comprising a flat band spring connected to the outer periphery of said washer and being wound around said washer with the free end adapted to engage an adjoining surface, whereby said washer may be interposed between a valve spring and an engine part for incrementally driving the valve in rotation.

13. A valve rotating device comprising a valve stem, a valve spring surrounding the stem, a washer having an axially flanged center opening through which said valve stem extends, said washer having a plurality of slots extending from the outer periphery thereof generally tangentially inwardly of the center opening, thereby to form a plurality of circumferentially spaced arms, each of said arms having a finger portion coextensive in length with said corresponding slot and being offset axially, said washer being engageable on one side against an engine part and said fingers being a movable support surface for engaging and bottoming a valve spring, and an external clutch spring comprising a band fastened to the external peripheral surface of said washer and wound around said washer to lie adjacent an adjoining wall of the engine part whereby flattening of said washer fingers in response to increased valve loading will incrementally rotate the valve, and the engine part and said clutch spring will prevent reverse rotation, thereby to rotatably drive the valve unidirectionally.

14. A valve rotating device comprising a valve stem, and a valve spring surrounding the stem, a washer having an axially flanged center opening through which said valve stem extends, said washer having a plurality of slots extending from the outer periphery thereof generally tangentially inwardly of the center opening, thereby to form a plurality of circumferentially spaced arms, each of said arms having a finger coextensive in length with a corresponding slot, said valve spring being bottomed against said washer, said fingers being offset axially and engageable against an engine part, and a clutch spring engaged at one end with said washer and having at least two coils extending around said valve stem for temporarily locking said washer to the engine part, whereby flattening of said washer fingers in response to increased valve loading will effect incremental unidirectional rotation between the valve and the engine part.

15. Means for rotating two axially adjacent relatively rotatable parts comprising, in combination, a multiple cantilever arm spring washer for transmitting normal axial load between the parts, said washer having multiple cantilever arms compressible between the parts to a flat shape in response to an increased axial load, thereby to effect incremental rotation of the washer, and spring locking means securing the washer to one of the parts, whereby the parts will be locked against counterrotation by said spring locking means upon decreasing the axial load to normal.

References Cited in the file of this patent

UNITED STATES PATENTS

| | | |
|---|---|---|
| 2,516,795 | Norton | July 25, 1950 |
| 2,653,587 | Rasmussen et al. | Sept. 29, 1953 |
| 2,714,375 | Hirschberger | Aug. 2, 1955 |
| 2,847,981 | Sampietro | Aug. 19, 1958 |